T. L. VALERIUS.
CREAM RIPENER.
APPLICATION FILED APR. 14, 1909.
933,934.
Patented Sept. 14, 1909.
2 SHEETS—SHEET 2.
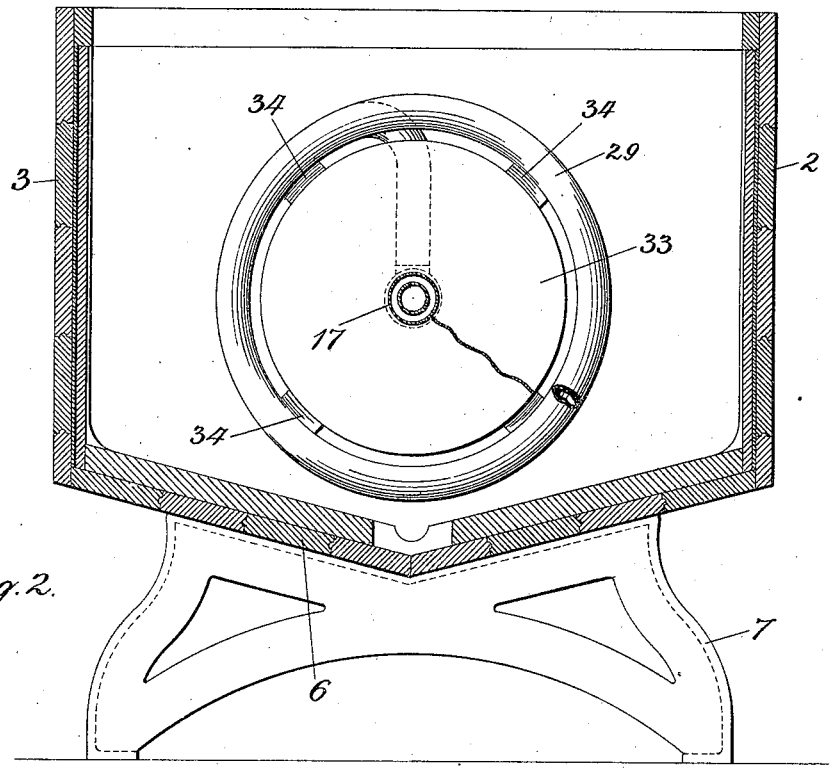
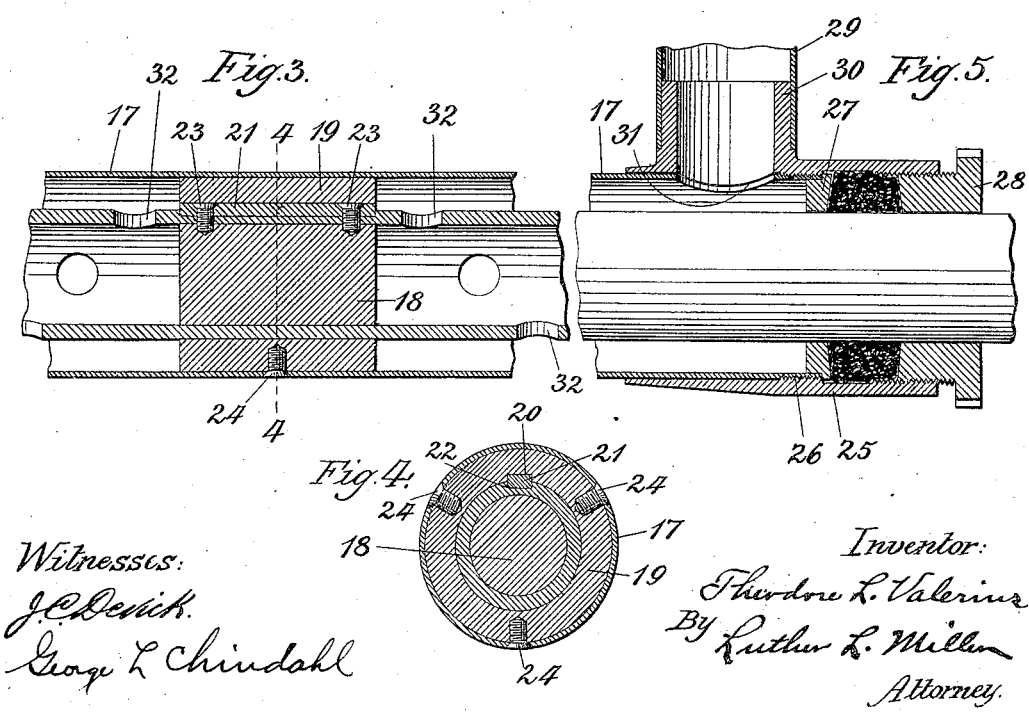
Witnesses:
J. C. Devick.
George L. Chindahl
Inventor:
Theodore L. Valerius
By Luther L. Miller
Attorney.

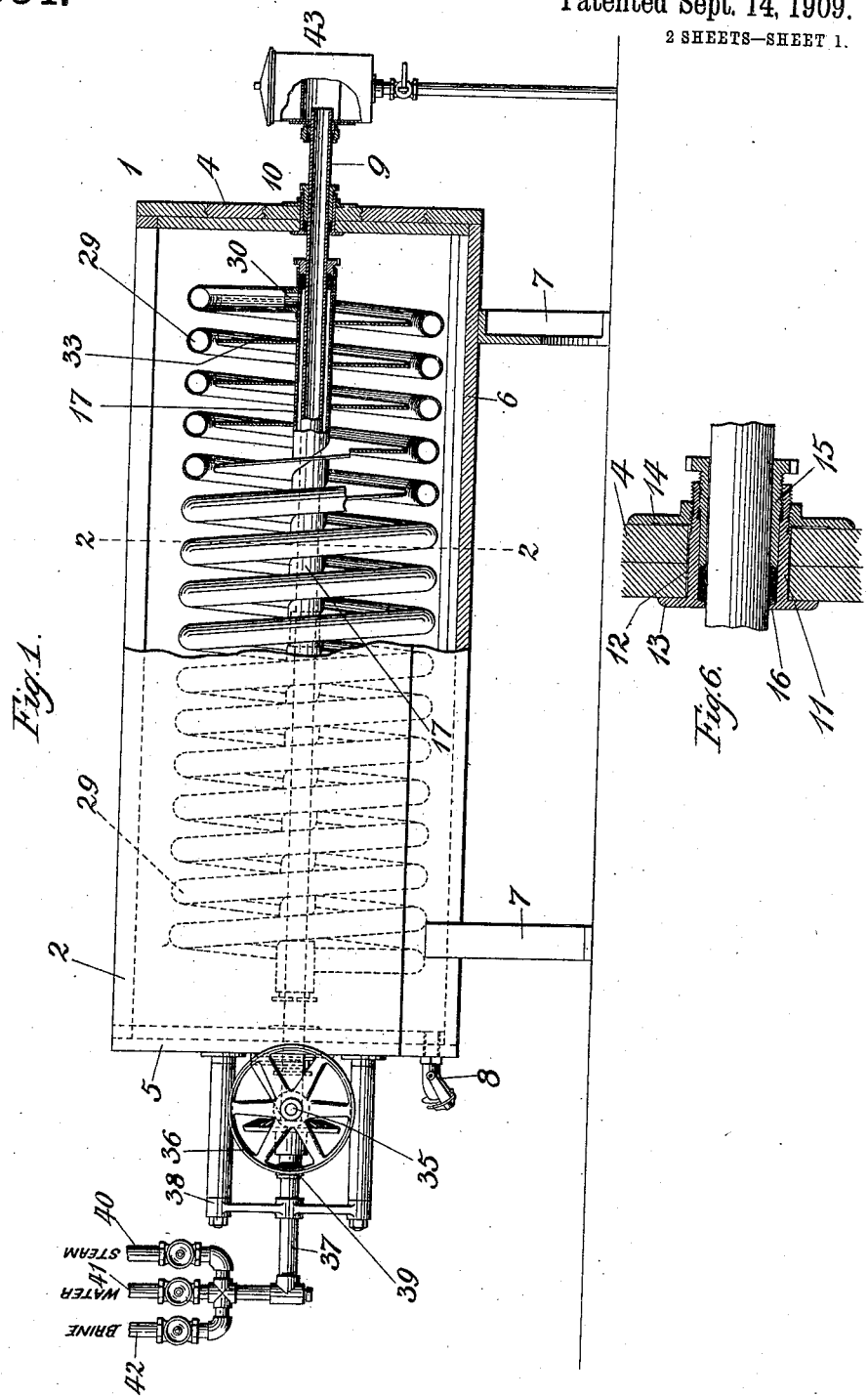

UNITED STATES PATENT OFFICE.

THEODORE L. VALERIUS, OF FORT ATKINSON, WISCONSIN, ASSIGNOR TO CREAMERY PACKAGE MANUFACTURING COMPANY, OF CHICAGO, ILLINOIS, A CORPORATION OF ILLINOIS.

CREAM-RIPENER.

933,934.

Specification of Letters Patent.   Patented Sept. 14, 1909.

Application filed April 14, 1909.   Serial No. 489,925.

*To all whom it may concern:*

Be it known that I, THEODORE L. VALERIUS, a citizen of the United States, residing at Fort Atkinson, in the county of Jefferson and State of Wisconsin, have invented certain new and useful Improvements in Cream-Ripeners, of which the following is a specification.

The object of this invention is to produce an improved machine for use in ripening cream.

In the accompanying drawings, Figure 1 is a side elevation, partly in section, of a machine embodying the features of my invention. Fig. 2 is a transverse section on line 2 2 of Fig. 1. Fig. 3 is an axial section through the hollow shaft and the lining tube upon said shaft. Fig. 4 is a section on line 4 4 of Fig. 3. Fig. 5 is an enlarged detail of a stuffing box for preventing leakage between said tube and said hollow shaft. Fig. 6 is a detail of one of the bearings for the hollow shaft.

The embodiment selected for illustration comprises a vat 1 of any suitable form and construction. As herein shown, it consists of side walls 2 and 3, end walls 4 and 5, and a bottom 6, and is supported upon legs 7. The vat may be constructed of wood, and, if desired, may be lined with tinned sheet copper or other suitable material. In practice, the vat may be provided with a cover, not herein shown. The cream is poured into the vat through the open top thereof, and after having been ripened may be drained off through the drain connection 8.

The means for agitating, smoothing, emulsifying and tempering the cream and for obtaining a thorough admixture of the starter with the cream comprises a hollow shaft 9 rotatably supported in bearings 10 in the end walls 4 and 5 of the vat. These bearings may be of any suitable construction, but each preferably is of the form shown in Fig. 6. As shown in said figure, a sleeve 11 is adapted to lie within an opening 12 in the end wall of the vat, said sleeve having a flange 13 to lie in contact with the inner face of the wall. The sleeve 11 is secured in place by means of a nut 14 turned upon the outer projecting end of the sleeve and lying in contact with the outer face of the end wall. A bearing sleeve 15 has a screw-thread connection with the sleeve 11 and is adapted to confine packing material between its inner end and the annular inwardly-projecting flange 16 upon the sleeve 11.

A tube 17 of larger internal diameter than the outer diameter of the hollow shaft 9 is mounted upon said shaft so as to provide an annular space surrounding said shaft to contain the tempering fluids. The means herein shown for securing the tube 17 to the shaft 9 comprises a plug 18 of suitable material, as, for example, Babbitt metal, placed in the shaft 9 about midway between the end walls 4 and 5, and a collar 19 fitting upon said shaft within said tube. The collar 19 is grooved, as at 20, to fit over a key 21, said key fitting within a keyway 22 in the shaft 9 and being secured in said keyway by means such as screws 23 extending into the plug 18. The tube 17 is secured to the collar 19 by suitable means, as, for example, a plurality of screws 24. A stuffing box is provided at each end of the tube 17. In the form herein shown the stuffing box comprises a sleeve 25 fitting over the end of the tube and having a screw-thread connection with said tube at 26. The sleeve 25 is annularly recessed to provide in conjunction with the end of the tube 17 a shoulder against which an annular shoulder upon a ring 27 may bear. The gland or packing nut 28 has a screw-thread connection with the sleeve 25 and is arranged to confine the packing material between its inner end and the ring 27. A helix 29 of tubing is secured to the tube 17 by means of short tubes or nipples 30 formed upon the sleeves 25, each end of the tubing fitting over and being secured to one of said tubes 30. Each of the tubes 30 communicates with the interior of the tube 17 through an opening 31 in the last mentioned tube. The hollow shaft 9 is arranged to communicate with the interior of the tube 17 near the longitudinal center of the latter and at opposite sides of the collar 19 and plug 18 by means of one or more openings 32 in said hollow shaft.

Rigidly secured to the exterior of the tube 17 in any suitable manner, as by soldering or brazing, is a screw 33 which may be formed of sheet metal. The number of turns in the screw 33 and the inclination of said turns to the axis of the shaft 9 correspond to the number of turns and inclination of the turns of the helix 29. Preferably the diameter of the worm 33 is slightly less than the internal diameter of the helix 29 in order to provide a space between said helix and said worm through which a wiping cloth or the like may be passed in cleaning the machine. If desired, the pipe coil and the worm may be connected together at intervals, as by means of a suitable number of lugs 34 extending from one to the other. The shaft 9 together with the helix 29 and the worm 33 may be rotated by any preferred means, as, for instance, a drive shaft 35 supported upon the end wall 5 and geared to the shaft 9, said drive shaft carrying a drive wheel 36. The power applied to the shaft 9 is transmitted to the tube 17 through the drive collar 19, and from the tube 17 to the helix 29 through the tube 30 and the screw 33 and lugs 34.

The tempering fluids may be admitted to the rotating tempering device by means of a pipe 37 fixed in a bracket 38 and connected with one end of the hollow shaft 9 through a stuffing box 39.

40, 41 and 42 are valved pipes through which steam, water and brine may be admitted to the pipe 37, as required in the operation of the machine.

The tempering fluids may be discharged from the rotatable tempering structure in any suitable way, for example, as shown in Patent No. 790,466, issued to me on May 23, 1905, a portion of the discharge means shown in said patent being herein illustrated at 43.

In operation, the tempering fluids flow from the pipe 37 through the hollow shaft 9 to the plug 18, thence through the openings 32 at the left-hand side of said plug, thence through the annular space between the shaft 9 and the tube 17 to the left-hand end of the helix 29, thence through said helix to the right-hand end of the tube 17, through the annular space between said tube and the shaft to the collar 19, through the openings 32 to the shaft 9 and thence to the discharge 43. It will thus be seen that a very large area of radiating surface is provided, thereby rapidly and thoroughly tempering the body of cream in the vat. The screw 33 being connected to the tube 17 and the helix 29, said screw also constitutes a radiating device of very large area, and, being immersed in the cream, assists to bring the cream to the temperature of the tempering fluid. As the helix 29 and the worm 33 revolve they cause a circulatory movement of the cream from one end of the vat to the other and back at each side to the starting point, thus bringing the mass of cream to a uniform temperature, smoothing and emulsifying the cream, mixing it thoroughly with the starter, and insuring that all portions of the body of cream are brought to a condition of uniform ripeness.

The rotatable structure formed by the hollow shaft 9, the tube 17, the helix 29 and the screw 33 is considerably simpler and less expensive in construction than forms heretofore proposed, yet is very efficient in agitating, smoothing, emulsifying and tempering the cream.

I would have it understood that the invention is not limited to the details of construction herein shown and described, for various modifications will occur to persons skilled in the art.

I claim as my invention:

1. In a cream ripener, in combination, a vat; a rotatable structure in said vat comprising a helically coiled tube and a screw located within the helix; and connections for passing a tempering fluid through said helix.

2. In a cream ripener, in combination, a vat; a rotatable structure in said vat comprising a shaft adapted to contain a tempering fluid, a helically coiled tube communicating with said shaft and a screw located on said shaft within the helix; and connections for conveying a tempering fluid to said shaft.

3. In a cream ripener, in combination, a vat; a shaft rotatably mounted in said vat; a tubular helix carried by said shaft; a screw carried by said shaft; and means for passing a tempering fluid through said helix.

4. In a cream ripener, in combination, a vat; a rotatable structure in said vat comprising a hollow shaft, a tube forming an annular chamber surrounding said shaft and communicating with the interior thereof, and a helically coiled tube communicating with said chamber; and connections for passing a tempering fluid through said structure.

5. In a cream ripener, in combination, a vat; a rotatable structure in said vat comprising a hollow shaft, a tube forming an annular chamber surrounding said shaft and communicating with the interior thereof, and a screw secured upon the periphery of said tube; and connections for passing a tempering fluid through said structure.

6. In a cream ripener, in combination, a vat; a rotatable structure in said vat comprising a hollow shaft, a tube forming an annular chamber surrounding said shaft and communicating with the interior thereof, a helically coiled tube communicating with said chamber, and a screw secured upon the periphery of the second mentioned tube within the helix; and connections for passing a tempering fluid through said structure.

7. In a cream ripener, in combination, a vat; a rotatable structure in said vat comprising a hollow shaft having a partition therein, two chambers surrounding said shaft and communicating therewith at points adjacent to said partition, and a tubular helix communicating at each end with one of said chambers; and connections for passing a tempering fluid through said structure.

8. In a cream ripener, in combination, a vat; a rotatable structure in said vat comprising a hollow shaft having a partition therein substantially midway between its ends, a tube inclosing said shaft, means for closing the ends of said tube, a partition in said tube substantially midway between its ends, said tube communicating with the interior of said shaft at opposite sides of said partitions, and a helically coiled tube communicating at its ends with the ends of the first mentioned tube; and connections for passing a tempering fluid through said structure.

9. In a cream ripener, in combination, a vat; a hollow shaft rotatably mounted in said vat; a partition in said shaft substantially midway between its ends; a tube inclosing said shaft; a partition in said tube substantially midway between its ends; a stuffing box structure secured to each end of said tube and closing the ends of said tube, said tube communicating with the interior of said shaft at opposite sides of said partitions; a helically coiled tube secured at its ends to said stuffing box structures and communicating with the interior of the first mentioned tube; and connections for passing a tempering fluid through said shaft.

10. In a cream ripener, in combination, a vat; a shaft rotatably mounted in said vat; a tubular helix supported by said shaft; a screw supported by said shaft and located within said helix, said helix and said screw being similar in the number and inclinations of their turns; connections between said helix and said screw; and means for passing a tempering fluid through said helix.

11. In a cream ripener, in combination, a vat; a hollow shaft rotatably mounted in said vat; a tube inclosing said shaft; means for closing each end of said tube comprising a sleeve connected with said tube, a packing nut connected with said sleeve, means attached to said sleeve for retaining packing material, and packing material between said retaining means and said nut; a tubular helix attached at each end to one of said sleeves, said shaft communicating with said tube and the latter communicating with said helix; and connections for passing a tempering fluid through said shaft, tube and helix.

THEODORE L. VALERIUS.

Witnesses:
R. B. CORNISH,
F. E. SCRIBNER.